United States Patent [19]
Dygos

[11] 3,894,053
[45] July 8, 1975

[54] 2-OXYGENATED 5-(1,2,3,4-TETRAHYDRO-6-METHOXY-2-NAPHTHYL)-1-METHYLCYCLOPEN-TANEACETIC ACID AND SALTS, ESTERS, AND A LACTONE THEREOF

[75] Inventor: John H. Dygos, Northbrook, Ill.

[73] Assignee: G. D. Searle & Co., Chicago, Ill.

[22] Filed: Apr. 23, 1974

[21] Appl. No.: 463,294

[52] U.S. Cl. ...... 260/343.3; 260/473 F; 260/476 C; 260/488 CD; 260/520; 424/279; 424/308; 424/311; 424/317
[51] Int. Cl. ............................................. C07d 5/06
[58] Field of Search ............ 260/343.3, 473 F, 520, 260/476 C, 488 CD

[56] References Cited
UNITED STATES PATENTS
3,159,649  12/1964  Brown et al. .................... 260/343.3

*Primary Examiner*—James A. Patten
*Attorney, Agent, or Firm*—John M. Brown

[57] ABSTRACT

Preparation and the antibiotic utility of 2-oxygenated 5-(1,2,3,4-tetrahydro-6-methoxy-2-naphthyl)-1-methylcyclopentaneacetic acids and salts, esters, and a lactone thereof are disclosed.

7 Claims, No Drawings

2-OXYGENATED 5-(1,2,3,4-TETRAHYDRO-6-METHOXY-2-NAPHTHYL)-1-METHYLCYCLOPENTANEACETIC ACID AND SALTS, ESTERS, AND A LACTONE THEREOF

This invention relates to 2-oxygenated 5-(1,2,3,4-tetrahydro-6-methoxy-2-naphthyl)-1-methylcyclopentaneacetic acids and salts, esters, and a lactone thereof, and to processes for their preparation. More particularly, this invention provides new, useful, and unobvious chemical compounds of the formula

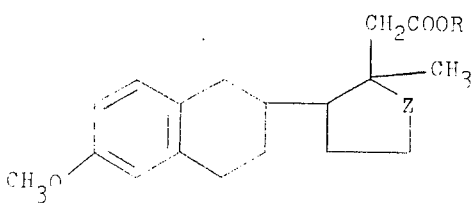

wherein R represents hydrogen, alkali metal, lower alkyl, or benzyl and Z represents carbonyl or optionally-esterified hydroxymethylene of the formula

in which R' represents hydrogen, lower alkanoyl, or benzoyl.

Among the alkali metals represented by R, sodium and potassium are preferred. The lower alkyls represented by R include methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of the formula $$-C_nH_{2n+1}$$

wherein $n$ represents a positive integer less than 8.

The lower alkanoyls represented by R' have the formula

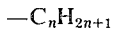

in which the lower alkyl substituent is defined as before.

Those skilled in the art will recognize that the enformulated compounds occur in a plurality of configurations such that the contemplated 2-oxy function can be either cis or trans with respect to the acetic constituent. When the relationship is cis, 5-(1,2,3,4-tetrahydro-6-methoxy-2-naphthyl)-2-hydroxy-1-methylcyclopentaneacetic acid does not ordinarily persist as such, but instead lactonizes to cis-hexahydro-4-(1,2,3,4-tetrahydro-6-methoxy-2-naphthyl)-3a-methyl-2H-cyclopenta[b]furan-2-one, a further embodiment of the invention disclosed herein.

The compounds to which this invention relates are useful by reason of their valuable biological properties. Thus, for example, they are antibiotic: They prevent the growth of bacteria such as *Bacillus subtilis*, *Escherichia coli*, and *Erwinia* sp., and of fungi such as *Trichophyton mentagrophytes* and *Verticillium albo-atrum*.

Using procedures substantially as described in U.S. Pat. No. 3,682,951, the products of Examples 2 and 8 hereinafter were found active versus *Erwinia* sp. and *T. mentagrophytes*, at concentrations as low as 1000 µg per ml. Other descriptions of how to use antibacterial and antifungal agents — like those aforesaid essentially well and widely know — are set forth in U.S. Pat. No. 3,668.251.

Preparation of compounds of this invention in which the 2-oxy function is trans to the acetic constituent proceeds as follows: 2-Acetoxy-5-(1,2,3,4-tetrahydro-6-methoxy-1-oxo-2-naphthyl)-1-methylcyclopentaneacetic acid wherein the aforesaid trans configuration obtains [as, for example, in "17β-acetoxy-3-methoxy-9-oxo-9,11-seco-oestra-1,3,5(10)-trien-11-oic acid", the preparation of which is described in J. Chem. Soc., 1968, 2603] is hydrogenated at 50 pounds per square inch (psi) in warm ethanol, using 5% palladium-on-charcoal as catalyst, to give the corresponding des-1-oxo compound. The ester group therein is saponified by heating with potassium hydroxide in aqueous methanol, and acidification thereupon affords 5-(1,2,3,4-tetrahydro-6-methoxy-2-naphthyl)-2-hydroxy-1-methylcyclopentaneacetic acid. The hydroxyl therein is esterified by contacting with an acid chloride in pyridine, or is oxidized to carbonyl by contacting with Jones' reagent [the chromium trioxide-sulfuric acid complex described in J. Chem. Soc., 1951, 2402] in acetone. The carbonyl in 5-(1,2,3,4-tetrahydro-6-methoxy-2-naphthyl)-2-hydroxy-1-methylcyclopentaneacetic acid is esterified by heating with an acetone di(lower alkyl) ketal in the corresponding lower alkanol, using p-toluenesulfonic acid as catalyst, and the hydroxyl in the resultant ester esterified as above, i.e., via acid chloride in pyridine. Contacting 5-(1,2,3,4-tetrahydro-6-methoxy-2-naphthyl)-2-hydroxy-1-methylcyclopentaneacetic acid with an alkali hydroxide in ethanol affords the corresponding acid salt, from which, on contacting with benzyl chloride in N,N-dimethylformamide, benzyl 5-(1,2,3,4-tetrahydro-6-methoxy-2naphthyl)-2-hydroxy-1-methylcyclopentaneacetate is obtained. Contacting this ester with an acid chloride in pyridine affords the corresponding diester.

Preparation of compounds of this invention in which the 2-oxy function is cis to the acetic constituent proceeds by reducing the 2-acetoxy-5-(1,2,3,4-tetrahydro-6-methoxy-1-oxo-2-naphthyl)-1-methylcyclopentaneacetic acid aforesaid with zinc amalgam in a mixture of acetic and hydrochloric acids. The cis hexahydro-4-(1,2,3,4-tetrahydro-6-methoxy-2-naphthyl)-3a-methyl-2H-cyclopenta[b]furan-2-one which results is converted to an alkali metal salt of the acid by heating with an alkali hydroxide in ethanol. From such salt, on contacting with benzyl or a lower alkyl chloride in N,N-dimethylformamide, benzyl or a lower alkyl 5-(1,2,3,4-tetrahydro-6-methoxy-2-naphthyl)-2-hydroxy-1-methylcyclopentaneacetate is obtained. The benzyl ester, heated with an acid chloride and pyridine in benzene, affords the corresponding diester, wherein the benzyl grouping is cleaved by hydrogenating at room temperatures and atmospheric pressure in ethanol, using 5% palladium-on-charcoal as catalyst.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade.

EXAMPLE 1

To a solution of 4.54 g of (1S,2S,5S)-2-acetoxy-5-(1,2,3,4-tetrahydro-6-methoxy-1-oxo-2-naphthyl)-1-methylcyclopentaneacetic acid [J. Chem. Soc., 1968, 2603] in 250 ml of ethanol is added 0.5 g of 5% palladium-on-charcoal, and the resultant mixture is agitated in a hydrogen atmosphere at 50° for 72 hours. The mixture thus obtained is filtered. The filtrate is stripped of solvent by vacuum distillation, affording a yellow oil which crystallizes on standing. The crystalline material is taken up in benzene; and the benzene solution is chromatographed on silica gel, using benzene and mixtures thereof with increasing amounts of ethyl acetate as developing solvents. From an eluate comprising 10% ethyl acetate in benzene, on evaporation of solvent and recrystallization of the residue from a mixture of ethyl acetate and hexane, (1S,2S,5S)-2-acetoxy-5-(1,2,3,4-tetrahydro-6-methoxy-2-naphthyl)-1-methylcyclopentaneacetic acid melting at 125°–127°.

EXAMPLE 2

To a solution of 3.33 g of (1S,2S,5S)-2-acetoxy-5-(1,2,3,4-tetrahydro-6-methoxy-2-naphthyl)-1-methylcyclopentaneacetic acid in 50 ml of methanol is added a solution of 3.00 g of potassium hydroxide in 15 ml of water. The resultant solution is refluxed for 2 hours, then diluted with 250 ml of water. Clarification is effected by filtration. The filtrate is acidified with hydrochloric acid. A solid precipitates which, isolated by filtration and recrystallized from a mixture of ethyl acetate and hexane, affords (1S,2S,5S)-5-(1,2,3,4-tetrahydro-6-methoxy-2-naphthyl)-2-hydroxy-1-methylcyclopentaneacetic acid melting at approximately 141.5°–142.5°.

EXAMPLE 3

To a solution of 0.318 g of (1S,2S,5S)-5-(1,2,3,4-tetrahydro-6-methoxy-2-naphthyl)-2-hydroxy-1-methylcyclopentaneacetic acid in 15 ml of pyridine is added 0.227 g of propionyl chloride. The resultant mixture is stirred at room temperatures for 6 hours, then poured onto 25 volumes of ice. The resultant mixture is acidified with hydrochloric acid, whereupon the aqueous phase is extracted with ether. The ether extract is dried over magnesium sulfate and then stripped of solvent by vacuum distillation. The residue is (1S,2S,5S)-5-(1,2,3,4-tetrahydro-6-methoxy-2-naphthyl)-1-methyl-2-propionyloxycyclopentaneacetic acid.

EXAMPLE 4

Substitution of 0.420 g of benzoyl chloride for the propionyl chloride called for in Example 3 affords, by the procedure there detailed, (1S,2S,5S)-2-benzolyloxy-5-(1,2,3,4-tetrahydro-6-methoxy-2-naphthyl)-1-methylcyclopentaneacetic acid.

EXAMPLE 5

To a solution of 3.00 g of (1S,2S,5S)-5-(1,2,3,4-tetrahydro-6-methoxy-2-naphthyl)-2-hydroxy-1-methycyclopentaneacetic acid in 50 ml of ethanol is added 0.4 g of sodium hydroxide. The resultant mixture is refluxed for 1 hour, whereupon solvent is removed by vacuum distillation. The residue is sodium (1S,2S,5S)-5-(1,2,3,4-tetrahydro-6-methoxy-2-naphthyl)-2-hydroxy-1-methylcyclopentaneacetate.

EXAMPLE 6

A solution of 2.19 g of (1S,2S,5S)-5-(1,2,3,4-tetrahydro-6-methoxy-2-naphthyl)-2-hydroxy-1-methylcyclopentaneacetic acid and 5 ml of 2,2-dimethoxypropane in 40 ml of methanol containing 0.05 g. of p-toluenesulfonic acid monohydrate is refluxed for 18 hours. The resultant solution is partitioned between aqueous 5% sodium bicarbonate and ether. The ether phase is separated, dried over magnesium sulfate, and stripped of solvent by vacuum distillation. The residue is crystallied from a mixture of acetone and hexane to give methyl (1S,2S,5S)-5-(1,2,3,4-tetrahydro-6-methoxy-2-naphthyl)-2-hydroxy-1-methylcyclopentaneacetate melting at approximately 86°–87°.

EXAMPLE 7

Excess Jones' reagent [J. Chem. Soc., 1951, 2402] is added to a solution of 0.718 g of (1S,2S,5S)-5-(1,2,3,4-tetrahydro-6-methoxy-2-naphthyl)-2-hydroxy-1-methylcyclopentaneacetic acid in 30 ml of acetone. The orange-colored reaction mixture turns green when, 10 minutes later, excess 2-propanol is introduced. The resultant mixture is partitioned between water and ether. The ether extract is dried over magnesium sulfate and then stripped of solvent by vacuum distillation. The residue is taken up in 2 ml. of benzene; and the resultant solution is chromatographed on dry silica gel, using 40% ethyl acetate, 58% benzene, and 2% acetic acid as developing solvent. Material identified by thin layer chromatograph as (1S,5S)-5-(1,2,3,4-tetrahydro-6-methoxy-2naphthyl)-1-methyl-2-oxocyclopentaneacetic acid is eluted with a mixture of ethanol and ether, isolated by evaporation of the solvent, and further purified by recrystallization from a mixture of benzene and hexane. The product, thus purified, melts at approximately 138°–139°.

EXAMPLE 8

To a slurry of 75 g of 20-mesh granular zinc metal in a mixture of 10 ml of concentrated hydrochloric acid with 200 ml of water is added, with stirring, 7.50 g of mercuric chloride. Stirring is continued for 10 minutes, whereupon the liquid is decanted; and the zinc amalgam thus formed is washed thoroughly with water. The amalgam is then added, with stirring, to a solution of (1S,2S,5S)-2-acetoxy-5-(1,2,3,4-tetrahydro-6-methoxy-1-oxo-2-naphthyl)-1-methylcyclopentaneacetic acid in 450 ml of hot acetic acid. Approximately 75 ml of concentrated hydrochloric acid is introduced; and the resultant mixture is refluxed for 20 minutes, whereupon a further 75 ml of hydrochloric acid is added at a rate such as to require 1½ hours during which refluxing is continued. The reaction mixture is then concentrated by evaporating in a stream of nitrogen, and the concentrate is poured into 2 liters of water. The resultant mixture is extracted with ethyl acetate. The extract is dried over magnesium sulfate, treated with decolorizing charcoal, and filtered. Solvent is removed from the filtrate by vacuum distillation. The residue is dissolved in benzene; and the benzene solution is chromatographed on silica gel, using benzene and mixtures thereof with increasing amounts of ethyl acetate as developing solvent. From an eluate comprising 2% ethyl acetate in benzene, on evaporation of solvent and recrystallization of the residue from a mixture of benzene and hexane, cis-hexahydro-4-(1,2,3,4-tetrahydro-6-methoxy-2-naphthyl)-3a-methyl-2H-cyclopenta[b]furan-2-one melting at 84°14 86° is obtained.

EXAMPLE 9

To a solution of 3.00 g of cis-hexahydro-4-(1,2,3,4-tetrahydro-6-methoxy-2-naphthyl)-3a-methyl-2H-cyclopenta[b]furan-2-one in 50 ml of ethanol is added 0.560 g of potassium hydroxide. The resultant mixture is refluxed for 1 hour, whereupon solvent is removed by vacuum distillation. The residue is potassium (1S,2R,5S)-5-(1,2,3,4-tetrahydro-6-methoxy-2-naphthyl)-2-hydroxy-1-methylcyclopentaneacetate.

EXAMPLE 10

To a solution of 0.356 g of potassium (1S,2R,5S)-5-(1,2,3,4-tetrahydro-6-methoxy-2-naphthyl)-2-hydroxy-1-methylcyclopentaneacetate in 20 ml of N,N-dimethylformamide is added a solution of 0.065 g of ethyl chloride in 5 ml. of N,N-dimethylformamide. The resultant solution is stirred at room temperatures for 2 hours, then poured into 50 ml of water. The mixture thus obtained is extracted with ether. The ether extract is dried over magnesium sulfate and then stripped of solvent by vacuum distillation. The residue is ethyl (1S,2R,5S)-5-(1,2,3,4-tetrahydro-6-methoxy-2-naphthyl)-2-hydroxy-1-methylcyclopentaneacetate.

EXAMPLE 11

Substitution of 0.127 g of benzyl chloride for the ethyl chloride called for in Example 10 affords, by the procedure there detailed, benzyl (1S,2R,5S)-5-(1,2,3,4-tetrahydro-6-methoxy-2-naphthyl)-2-hydroxy-1-methylcyclopentaneacetate.

EXAMPLE 12

To a solution of 0.408 g of benzyl (1S,2R,5S)-5-(1,2,3,4-tetrahydro-6-methoxy-2-naphthyl)-2-hydroxy-1-methylcyclopentaneacetate and 1 ml of pyridine in 20 ml of benzene is added a solution of 0.186 g of propionyl chloride in 5 ml of benzene. The resultant mixture is stirred at room temperatures for 3 hours, then washed with aqueous 10% sodium bicarbonate, dried over magnesium sulfate, and stripped of solvent by vacuum distillation. The residue is benzyl (1-S,2R,5S)-5-(1,2,3,4-tetrahydro-6-methoxy-2-naphthyl)-1-methyl-2-propionyloxycyclopentaneacetate.

EXAMPLE 13

A solution of 0.465 g of benzyl (1S,2R,5S)-5-(1,2,3,4-tetrahydro-6-methoxy-2-naphthyl)-1-methyl-2-propionyloxycyclopentaneacetate in 20 ml of ethanol is hydrogenated for 8 hours at room temperatures under atmospheric pressure, using 0.050 g of 5% palladium-on-charcoal as catalyst. The solution is then filtered, and the filtrate is stripped of solvent by vacuum distillation. The residue is (1S,2R,5S)-5-(1,2,3,4-tetrahydro-6-methoxy-2-naphthyl)-1-methyl-2-propionyloxycyclopentaneacetic acid.

EXAMPLE 14

Substitution of 0.280 g of benzoyl chloride for the propionyl chloride called for in Example 12 affords, by the procedure there detailed, benzyl (1S,2R,5S)-2-benzoyloxy-5-(1,2,3,4-tetrahydro-6-methoxy-2-naphthyl)-1-methylcyclopentaneacetate.

EXAMPLE 15

Substitution of 0.513 g of benzyl (1S,2R,5S)-2-benzoyloxy-5-(1,2,3,4-tetrahydro-6-methoxy-2-naphthyl)-1-methylcyclopentaneacetate for the benzyl (1S,2R,5S)-5-(1,2,3,4-tetrahydro-6-methoxy-2-naphthyl)-1-methyl-2-propionyloxycyclopentaneacetate called for in Example 13 affords, by the procedure there detailed, (1S,2R,5S)-2-benzoyloxy-5-(1,2,3,4-tetrahydro-6-methoxy-2-naphthyl)-1-methylcyclopentaneacetic acid.

What is claimed is:

1. A compound of the formula

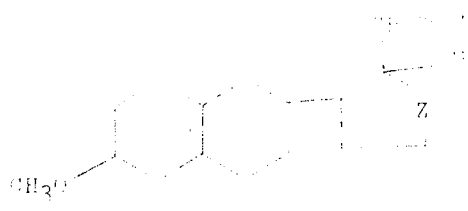

wherein R represents hydrogen, alkali metal, lower alkyl, or benzyl and Z represents carbonyl or optionally-esterified hydroxymethylene of the formula

in which R' represents hydrogen, lower alkanoyl, or benzoyl.

2. A compound according to claim 1 which has the formula

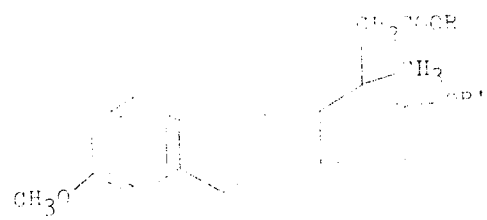

wherein R represents hydrogen, alkali metal, lower alkyl, or benzyl, and R' represents hydrogen, lower alkanoyl, or benzoyl.

3. A compound according to claim 1 which is (1S,2S,5S)-5-(1,2,3,4-tetrahydro-6-methoxy-2-naphthyl)-2-hydroxy-1-methylcyclopentaneacetic acid.

4. cis-Hexahydro-4-(1,2,3,4-tetrahydro-6-methoxy-2-naphthyl)-3a-methyl-1-2H-cyclopenta[b]furan-2-one.

5. A compound according to claim 1 which is 5-(1,2,3,4-tetrahydro-6-methoxy-2-naphthyl)-2-(lower alkanoyloxy)-1-methlcyclopentaneacetic acid.

6. A compound according to claim 1 which is (1S,2S,5S)-2-acetoxy-5-(1,2,3,4-tetrahydro-6-methoxy-2-naphthyl)-1-methylcyclopentaneacetic acid.

7. A compound according to claim 1 which is (1S,5S)-5-(1,2,3,4-tetrahydro-6-methoxy-2naphthyl)-1-methyl-2-oxocyclopentaneacetic acid.

* * * * *

UNITED STATES PATENT OFFICE
CERTIFICATE OF CORRECTION

PATENT NO. : 3,894,053
DATED : July 8, 1975
INVENTOR(S) : John H. Dygos

It is certified that error appears in the above-identified patent and that said Letters Patent are hereby corrected as shown below:

Column 2, line 7, "know" should read -- known --.

Column 2, line 41, "2naphthyl" should read -- 2-naphthyl --.

Column 3, line 60, "benzolyloxy" should read -- benzoyloxy --.

Column 4, line 34, "chromatograph" should read -- chromatography --.

Column 4, line 35, "2naphthyl" should read -- 2-naphthyl --.

Column 5, line 5, "84°1486°" should read -- 84°-86° --.

Column 6, line 65, "2naphthyl" should read -- 2-naphthyl --.

UNITED STATES PATENT OFFICE
CERTIFICATE OF CORRECTION

Patent No. 3,894,053           Dated July 8, 1975

Inventor(s) John H. Dygos            Page 2 of 2

It is certified that error appears in the above-identified patent and that said Letters Patent are hereby corrected as shown below:

Claim 1, the first formula should appear as shown below:

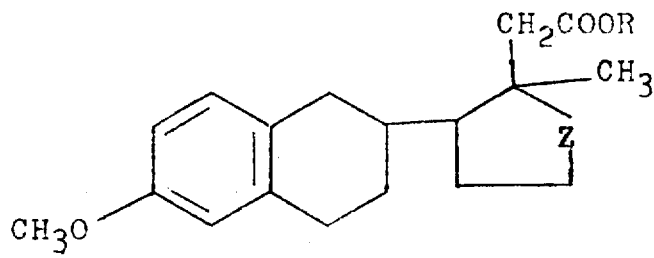

Claim 2, the formula should appear as shown below:

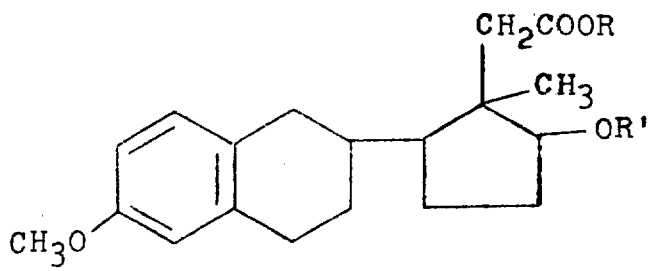

Signed and Sealed this twenty-fourth Day of February 1976

[SEAL]

Attest:

RUTH C. MASON
Attesting Officer

C. MARSHALL DANN
Commissioner of Patents and Trademarks